(12) United States Patent
Hellman et al.

(10) Patent No.: US 12,292,570 B2
(45) Date of Patent: May 6, 2025

(54) AUGMENTED NEAR TO EYE DISPLAY

(71) Applicant: ARIZONA BOARD OF REGENTS ON BEHALF OF THE UNIVERSITY OF ARIZONA, Tucson, AZ (US)

(72) Inventors: Brandon Hellman, Tucson, AZ (US); Yuzuru Takashima, Tucson, AZ (US)

(73) Assignee: ARIZONA BOARD OF REGENTS ON BEHALF OF THE UNIVERISTY OF ARIZONA, Tucson, AZ (US)

( * ) Notice: Subject to any disclaimer, the term of this patent is extended or adjusted under 35 U.S.C. 154(b) by 498 days.

(21) Appl. No.: 17/774,556

(22) PCT Filed: Sep. 21, 2020

(86) PCT No.: PCT/US2020/051732
§ 371 (c)(1),
(2) Date: May 5, 2022

(87) PCT Pub. No.: WO2021/091622
PCT Pub. Date: May 14, 2021

(65) Prior Publication Data
US 2022/0390746 A1 Dec. 8, 2022

Related U.S. Application Data

(60) Provisional application No. 62/931,514, filed on Nov. 6, 2019.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0036* (2013.01);
(Continued)

(58) Field of Classification Search
CPC .... G02B 27/0172; G02B 6/0016; G02B 6/36; G02B 26/0808; G02B 26/0833;
(Continued)

(56) References Cited

U.S. PATENT DOCUMENTS 10,317,677 B2 * 6/2019 Levola ............... G02B 27/0081
10,437,064 B2 * 10/2019 Popovich ............. G02B 6/0016
(Continued)

FOREIGN PATENT DOCUMENTS

DE 102018126375 A1 4/2019
WO 2017137127 A1 8/2017
WO 2018164914 A2 9/2018

OTHER PUBLICATIONS

Hellman, Brandon, et al., Angular and spatial light modulation by single digital micromirror device for multi-image butput and nearly-doubled etendue. Optics Express, vol. 27, No. 15, Jul. 22, 2019. pp. 21477-21494.
International Search Report and Written Opinion, PCT/US2020/051732 pp. 1-10. Mailing date of search report Dec. 18, 2020.

*Primary Examiner* — William R Alexander
(74) *Attorney, Agent, or Firm* — Bond, Schoeneck and King PLLC; George R. McGuire

(57) ABSTRACT

A mobile augmented reality near to eye display having one of a single chip programmed, configured, or adapted to permit user selective field of view and a variable resolution image projection, or a single image guide adapted to multiplexed full color image transfer to achieve full color, 90 degrees FOV, and retinal image resolution.

20 Claims, 21 Drawing Sheets

(51) Int. Cl.
*G02B 26/08* (2006.01)
*G03H 1/02* (2006.01)

(52) U.S. Cl.
CPC ..... *G02B 26/0808* (2013.01); *G02B 26/0833* (2013.01); *G03H 1/0248* (2013.01); *G02B 2027/0114* (2013.01); *G02B 2027/0123* (2013.01); *G02B 2027/014* (2013.01); *G02B 2027/0174* (2013.01)

(58) Field of Classification Search
CPC .... G02B 2027/0114; G02B 2027/0123; G02B 2027/014; G02B 2027/0174; G02B 2027/0093; G02B 5/03; G03H 1/0248
USPC ...................................................... 359/13, 15
See application file for complete search history.

(56) References Cited

U.S. PATENT DOCUMENTS

| | | |
|---|---|---|
| 2016/0231569 A1* | 8/2016 | Levola ............... G02B 27/0081 |
| 2017/0307886 A1 | 10/2017 | Stenberg et al. |
| 2018/0011324 A1* | 1/2018 | Popovich ............. G02B 6/0076 |
| 2018/0232048 A1 | 8/2018 | Popovich et al. |
| 2018/0275402 A1 | 9/2018 | Popovich et al. |
| 2019/0094981 A1* | 3/2019 | Bradski ................ G06V 40/168 |
| 2019/0179153 A1* | 6/2019 | Popovich ............... G06V 40/19 |
| 2019/0339436 A1* | 11/2019 | Lee ...................... G02B 5/1823 |
| 2020/0201051 A1* | 6/2020 | Popovich ........... G02B 27/0172 |

* cited by examiner

AUGMENTED NEAR TO EYE DISPLAY

CROSS-REFERENCE TO RELATED APPLICATION

The present application is the National Stage Application filed under 35 U.S.C. 371 based on International Patent Application No. PCT/US20/51732, filed Sep. 21, 2020, which relates generally to applicant's following co-pending patent applications:

U.S. Provisional Patent Application 62/485,554 and International Application PCT/US18/27508 entitled "Systems and Methods For Beam Steering Using A Micromirror Device";

U.S. Provisional Patent Application 62/485,579 and International Application PCT/US18/27620 entitled "Methods And Apparatus For Angular And Spatial Modulation Of Light";

U.S. Provisional Patent Application 62/609,408 and International Application PCT/US18/67068 entitled "Methods And Apparatus For Angular And Spatial Modulation Of Light";

U.S. Provisional Patent Application 62/609,408 and International Application PCT/US18/67077 entitled "Methods And Apparatus For Angular And Spatial Modulation Of Light";

U.S. Provisional Patent Application 62/808,960 and International Application PCT/US20/19251 entitled "Angular Spatial Light Modulator Multi-Display";

U.S. Provisional Patent Application 62/880,730 and International Application PCT/US20/44395 entitled "Waveguide for Angular Space Light Modulator Display"; and U.S. Provisional Patent Application 62/884,546 and International Application PCT/US20/45579 entitled "Space, Time and Angular Multiplexed Dynamic Image Transfer for Augmented Reality Display."

The present application also relates and claims priority to U.S. Provisional Patent Application 62/931,514, filed Nov. 6, 2019.

Each of the foregoing is incorporated herein by reference in their entireties.

GOVERNMENT FUNDING

N/A

FIELD OF THE INVENTION

The present disclosure is directed generally to augmented reality ("AR") near-to-eye displays, and more particularly to retinal resolution and single-chip multiplexed image transfer for AR near-to-eye displays.

BACKGROUND

Mobile AR near-to-eye displays (AR-NEDs) require a reduction of size, weight, cost, and power of display optics while increasing resolution (1 arcmin), field of view ("FOV") (90 degrees in horizontal full FOV), optical efficiency, and the eye box size to accommodate FOV. Among display components/optics, the holographic waveguide employed for AR-NED is one of the bottle necks that limits FOV to several tens of degrees per single color. Moreover, required pixel counts and pixel densities exceed state-of-the-art micro displays if the entire FOV of 90 degree supports retinal resolution.

Suppose an image with an FOV of 90(H)×30(V) degrees has retinal resolution (1 arc min) for a total number of pixels of 10M (5.4K×1.8K=9.72M (~10Mega)). However, state-of-the-art micro displays are about 1080p (1920×1080=2Mega) for 4.7 times fewer pixels. Even if a 10M-pixel micro display was developed with state-of-the-art 3 um pixel pitch, the display would have a size of 16×5.4 mm— too large for mobile AR-NED. In addition, even with a 10M pixel micro display, the limited angular bandwidth of the image guide prohibits transferring a 90 deg FOV image. The straight-forward approach is dividing FOV into sub FOVs and allocate them to multiple image guides, however, the multi-image guide approach is size, weight, and cost prohibitive, especially for full-color and wide FOV applications. In addition, the AR-NED has to be power, weight and space conscious. Ultimately, a single-layer image transfer medium with a small form factor and high-resolution display with low power consumption is highly anticipated for mobile AR-NEDs.

There are similar challenges of AR-NEDs in optical fiber and wireless communications: transferring large information via band limited channel. Communication channels (glass fiber, or free space) are usually bandlimited in frequency, either by dispersion of optical fiber, or regulation in bandwidth allocation.

Accordingly, there is a need in the art for an invention that overcomes the challenges of deficient pixel counts and limited angular bandwidth of the image guide.

SUMMARY

The present disclosure is directed to both a 1) Single-chip, FOV-selective, and variable resolution image projection, and 2) Multiplexed full color image transfer via a single image guide, to achieve full color, 90 degrees FOV, and retinal image resolution.

To increase the channel capacity, multiplexing methods, such as Time Division Multiple Access (TDMA), Frequency Domain Multiple Access (CDMA), Code Division Multiple Access (CDMA), and Wavelength Division Multiplexing (WDM) are employed along with polarization and space multiplexing, similar to optical communication multiplexing solutions by using multi-core fibers. In these multiplexing techniques, the signal is modulated and distributed across multiple, orthogonal and bandlimited domains (space, time, frequency, polarization, and code) for transfer, then demodulated and re-combined to recover the full and original bandwidth of the signal.

In one aspect of the invention, the multiplexing methods are applied to overcome the FOV limitation of the image guide device. Not merely applying them to AR-NED, but also to Angular Spatial Light Modulation (ASLM) displays that are the subject of the cross-referenced applications listed above, solves challenges of pixel counts in unique and power/cost/space effective way as follows.

In another aspect, an image guide device comprises a digital micromirror device (DMD) with an illumination source optically couple thereto; wherein a plurality of wavelengths from the illumination source each have a total field of view (FOV) and the DMD divides the total FOV into sub-FOVs; an image guide having an input grating and output grating, the input grating optically coupled to the DMD such that the image guide receives the plurality of wavelengths with sub-FOVs from the DMD at the input grating; a holographic waveguide optically coupled to the output grating of the image guide such that the holographic waveguide receives the plurality of wavelengths with sub-FOVs and multiplexes the plurality of wavelengths to the total FOV.

In an embodiment, the holographic waveguide comprises one or more Bragg reflectors.

In an embodiment, the Bragg reflectors are positioned at a 15-degree angle.

In an embodiment, the illumination source is an LD or LED array.

In an embodiment, the illumination source is a 2D light source array.

In an embodiment, image guide device further comprises detection optics optically coupled to the holographic waveguide, wherein the detection optics capture the total FOV from the holographic waveguide.

In another aspect, an image guide device comprises a primary digital micromirror device (DMD) with an illumination source optically couple thereto; wherein a plurality of images from the illumination source each have a total field of view (FOV) and the primary DMD divides the total FOV into sub-FOVs; an image guide having an input grating and output grating, the input grating optically coupled to the primary DMD such that the image guide receives the plurality of images with sub-FOVs from the primary DMD at the input grating; a secondary DMD optically coupled to the output grating of the image guide such that the secondary DMD receives the plurality of images with sub-FOVs and redirects the plurality of images with sub-FOVs over the total FOV.

In an embodiment, the illumination source is an LD or LED array.

In an embodiment, the illumination source is a 2D light source array.

In an embodiment, an image guide device further comprises detection optics optically coupled to the secondary DMD, wherein the detection optics capture the total FOV from the secondary DMD.

In another aspect, an augmented reality near to eye display system comprises an Angular Spatial Light Modulator (ASLM) emitting pulses of light, each pulse of light being spatially modulated with an image, and angularly modulated with a direction; a waveguide with an input coupler and an output coupler, wherein the input coupler is configured to couple the doubly modulated pulses of light from the ASLM into the waveguide, and the output coupler is configured to couple the pulses of light out of the waveguide.

In an embodiment, the ASLM comprises an illumination source array and a Spatial Light Modulator (SLM), and the pulse of light being angularly modulated is due to changing illumination sources.

In an embodiment, the ASLM comprises an illumination source and a Digital Micromirror Device (DMD), and the pulse of light being angularly modulated is due to diffraction-based beam steering, and each direction is a diffraction order.

In an embodiment, the ASLM comprises an illumination source array and a Digital Micromirror Device (DMD), and the pulse of light being angularly modulated is due to diffraction-based beam steering and changing illumination sources.

In an embodiment, the input coupler is an array of input couplers, and each input coupler is further configured to receive doubly modulated pulses of light of a unique direction.

In an embodiment, the augmented reality near to eye display system further compares a lens array configured to form the doubly modulated pulses of light into intermediate image array before the waveguide.

In an embodiment, the ASLM further modulates the pulses of light by wavelength, and the output coupler is wavelength multiplexed.

In an embodiment, the ASLM further modulates the pulses of light by polarization, and the output coupler is polarization multiplexed.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes an augmented reality near to eye display.

Single-Chip, FOV Selective, and Variable Color Bit Depth Image Generation

Figure 1A:
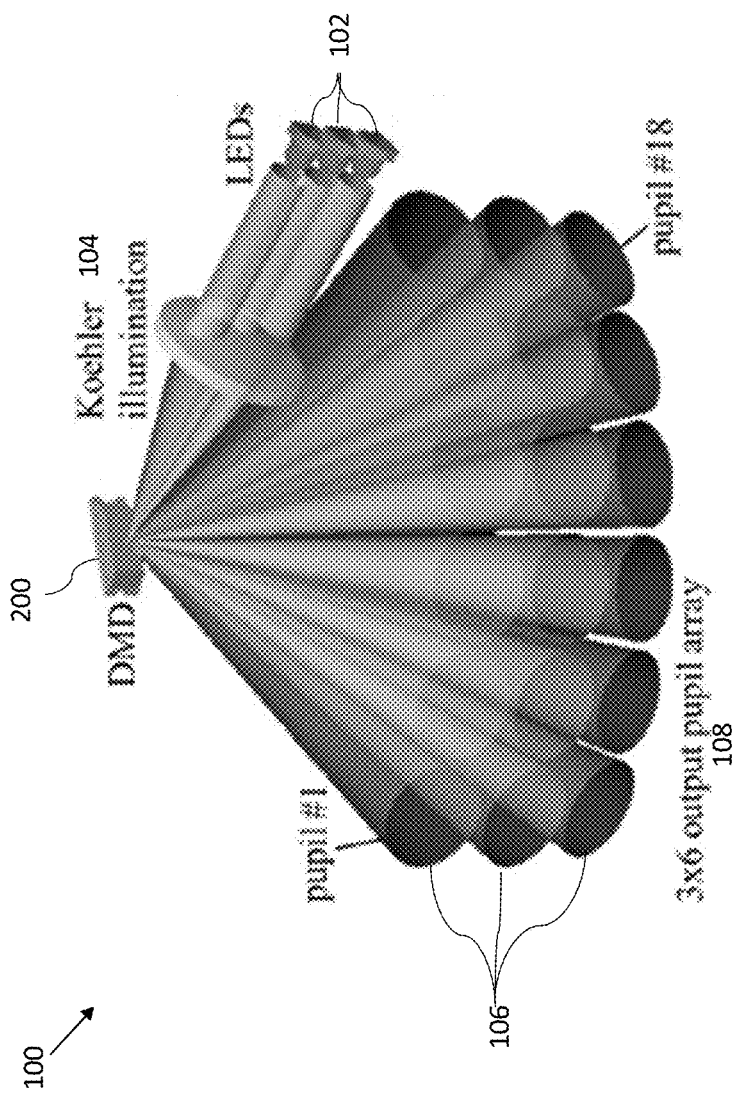
FIG. 1(a) is an ASLM 2D multi-view display by 3-LED pupil segmented Koehler illumination, in accordance with an embodiment.
Figure 1B:
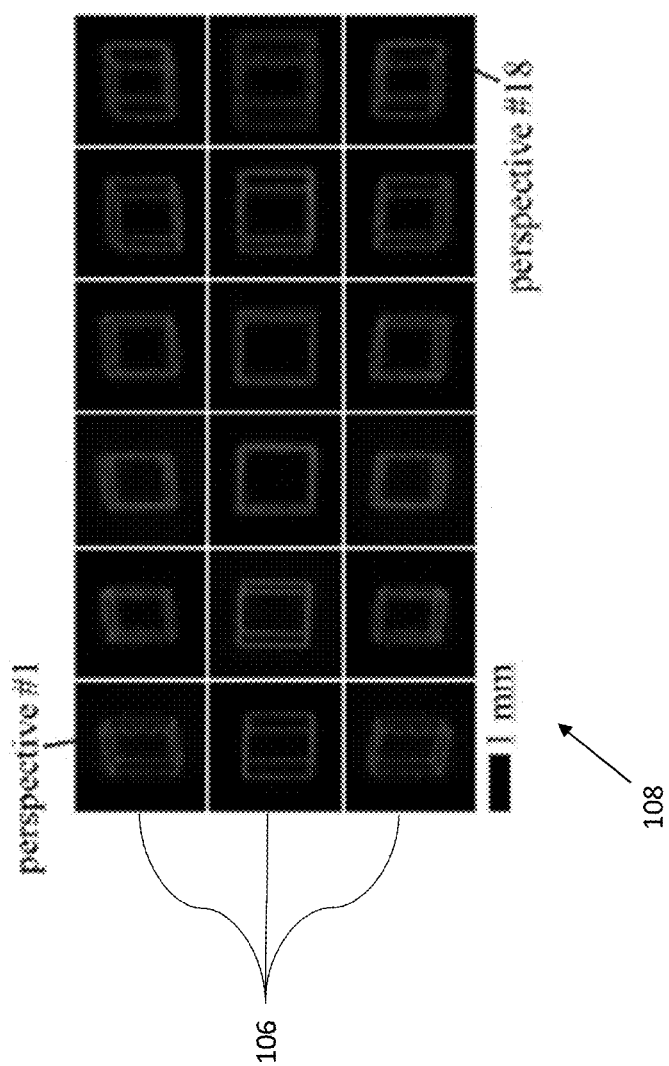
FIG. 1(b) are photos of the 18 angle-dependent patterns, arranged by viewing position corresponding to the 2D output pupil array ASLM 2D multi-view display by 3-LED pupil segmented Koehler illumination, in accordance with an embodiment.

A single-chip and multi perspective image display having an effective pixel count of 1.13 G pixels has been demonstrated. In the demonstration, a Digital Micromirror Device (DMD) 200 is synchronized to an arrayed pulsed illumination source (10×12=120) so that different images (1024×768 pixels) are steered into 12 diffraction orders. This time multiplexed image has an effective pixel count of (10×12)× (1024×768)×12=1.13 G pixels that enhances native pixel counts of the DMD 200 by 1440. In FIGS. 1(a) and 1(b), in one embodiment, time multiplexed images with effective 14 M pixel counts (=3×6×1024×768) is depicted.

Referring to FIG. 1(a), in one embodiment, illustrated is an ASLM 2D multi-view display 100 by 3-LED 102 pupil segmented Koehler illumination 104. Each vertically stacked LED 102 has six independent horizontally steered output diffraction orders 106 for a 3×6 array of outputs 108 for direct pattern viewing on the surface of the DMD 200. Referring to FIG. 1(b) photos of the 18 angle-dependent pattern, arranged by viewing position corresponding to the 2D output pupil array 108.

Figure 2:
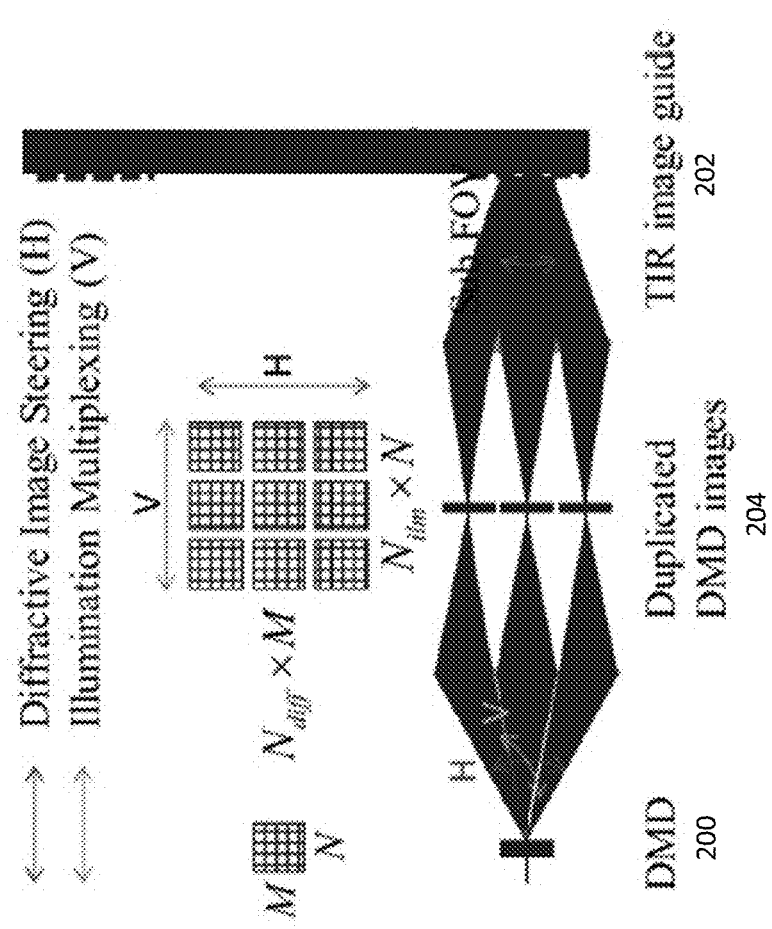
FIG. 2 illustrates a principle of single-chip, FOV selective, and variable color bit depth image generation by ASLM, in accordance with an embodiment.

Referring to FIG. 2, it schematically depicts the principle of single-chip, FOV selective, and variable color bit depth image generation by ASLM.

First, the FOV is limited to the supported angular bandwidth of the image guide 202. The full FOV of 90 degrees is divided into multiple sub FOVs, i.e., 30 degrees by wavelength multiplexing as described in the later section.

Consider a DMD 200 with M (Horizontal)×N (Vertical) pixels. Next further dividing the sub-FOV=30 degs into Ndiff segments where Ndiff is number of diffraction orders. The FOV of the i-th sub divided, FOVsub_i=(30/Ndiff). To satisfy the resolution requirement of 1 arcmin/pixel, M=60× FOVsub/Ndiff is needed. As an example, Ndiff=9, FOVsub=30 [deg], native pixel counts of DMD 200 in horizontal direction M=200 pixels. Suppose the number of vertical pixels N=360 (=1.8×M) pixels and 5 illumination angle multiplexing (Nilm=5) is employed, the 30(H)×30(V) sub FOV is divided in to 9×5 sub image area with 3.33(H)×6(V) degrees with 1 arcmin resolution. The 30 (H)×30 (V) degrees and tiled image 204 is generated by 200×360 pixel DMD projected by a projection lens and coupled to image guide 202 via input coupler.

In some embodiments, the multiple output diffraction orders are replaced with multiple output directions due to multiple input source directions.

Figure 3:
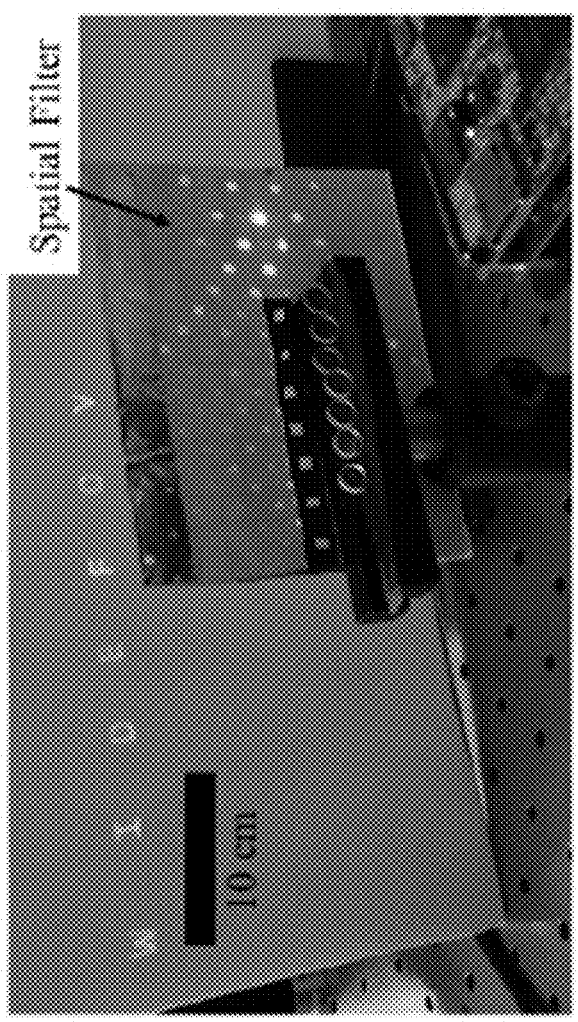
FIG. 3 illustrates a proof of concept of single-chip, FOV selective, and variable color bit depth image generation by ASLM wherein the effective pixel count is increased by factor of 7, in accordance with an embodiment.

Referring to FIG. 3, an experimental demonstration of the concept depicted in FIG. 2 is shown. In the demonstration, effective pixel count is increased by factor of Ndiff=7.

Advantages of the tiled and time multiplexed approach are 1) a substantial reduction of the number of physical pixels, no longer requiring a micro display with native 10Mega pixels, 2) a reduction of micro display size (1.08× 1.94 mm with 5.4 um DMD pixel, as compared to 16×5.4 mm for 10Mega with 3 um LCOS), and 3) decreased power consumption for display and illumination by a content-specific sub FOV selection as compared to full 10Mega pixel based approach that is described in later section.

For mobile AR-NED, pixel on/off ratio is substantially small compared to a VR headset. In backlit micro displays such as LCD and LCOS used for VR headset, all the pixels need to be illuminated even though part of the display area is turned off (filtering is optically inefficient). In contrast, the segmented approach allows images to be displayed within part of the FOV without illuminating the parts of the FOV with no information, a typical scenario for mobile AR-NED as FIG. 4(b) shows.

As the example figure shows, image/text 300 is displayed in conjunction with see-through image 302; therefore, it is not likely that image is displayed over the entire FOV of 90 degrees because such full FOV image would obscure and congest the see-through image.

The proposed approach steers the image to the location where the image is displayed; therefore, the power consumption for illumination is reduced as compared to the image formed by high pixel count micro display. The power advantage occurs due to not losing additional light in unused areas of the FOV, and due to not requiring display actuation to steer light into unused areas of the FOV. In addition, power consumption is further decreased by reducing the bit depth of the images out of the region of the interest by eye-tracking that detects gaze as described in later section. (Increased power efficiency and optical efficiency from foveated rendering.)

Single Layer and Multiplexed Full Color Wide FOV Image Transfer

Figure 4A:
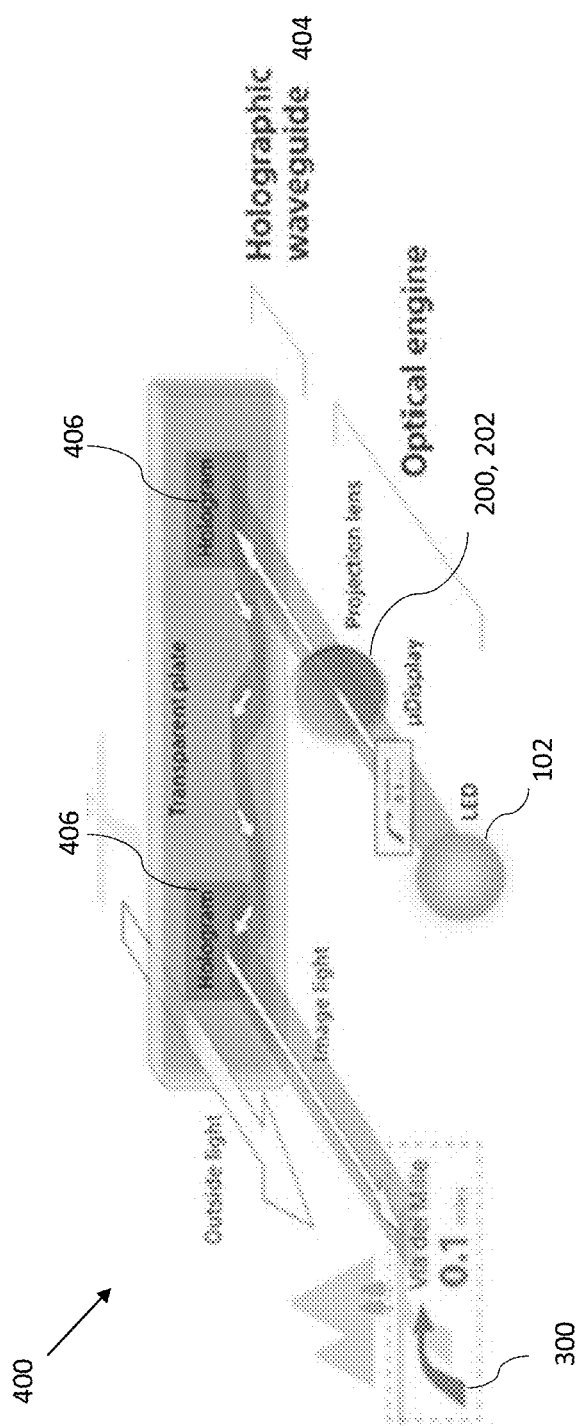
FIG. 4(a) is a schematic of the image display optical system of AR-NED, in accordance with an embodiment.
Figure 4B:
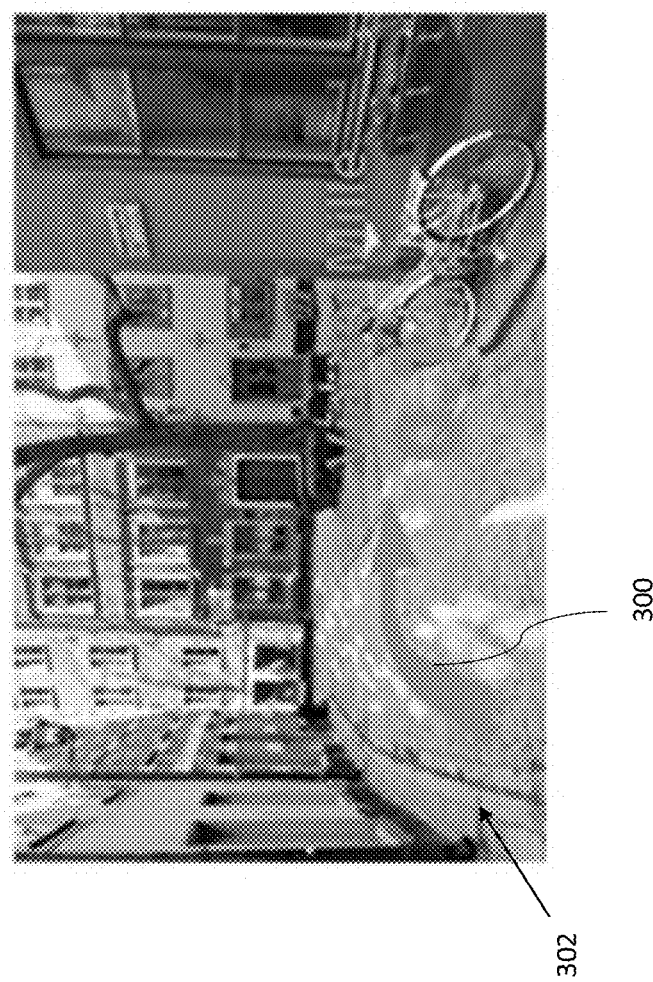
FIG. 4(b) is an image showing how projected image (in green) is superimposed on outside image of city, in accordance with an embodiment.

The index of refraction of the image guide device 400 (FIG. 4(a)) limits the FOV because the image 300 is transferred in a Total Internal Reflection mode. For example, the FOV is theoretically limited up to 60 degrees for an image guide 404 with n=2.0. The practical FOV for RGB image transfer is much smaller (~30 degrees) to assure reasonable number of TIRs (not too small nor too large) for all colors. The limited practical FOV of the image guide 202 is a serious bottle neck to achieve full color and 90-degree FOV image projection in terms of cost weight and size of optics. For example, a full color and 90 deg FOV system may require a 9-layer image guide 202 (=3 (RGB)×3 (~90 deg total FOV/30 deg)).

Figure 5A:
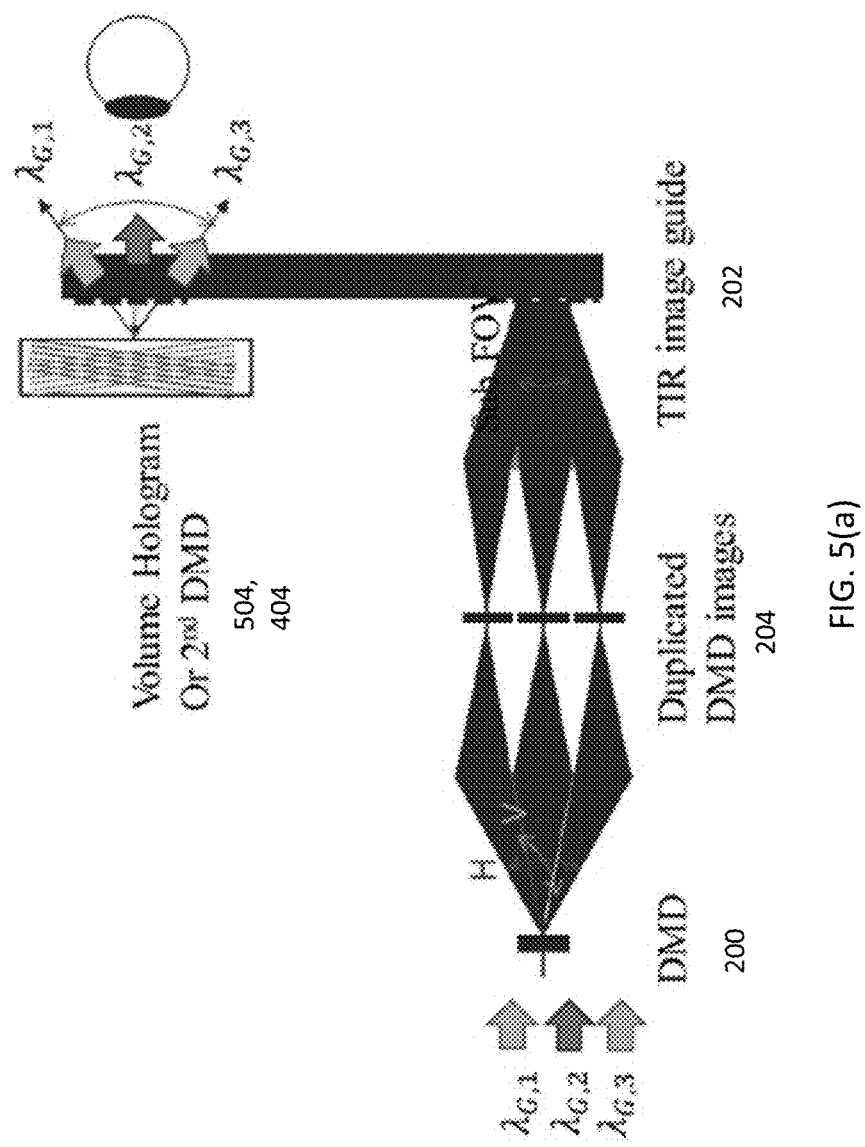
FIG. 5(a) is a schematic of single layer and multiplexed full color wide FOV image transfer, in accordance with an embodiment.
Figure 5B:
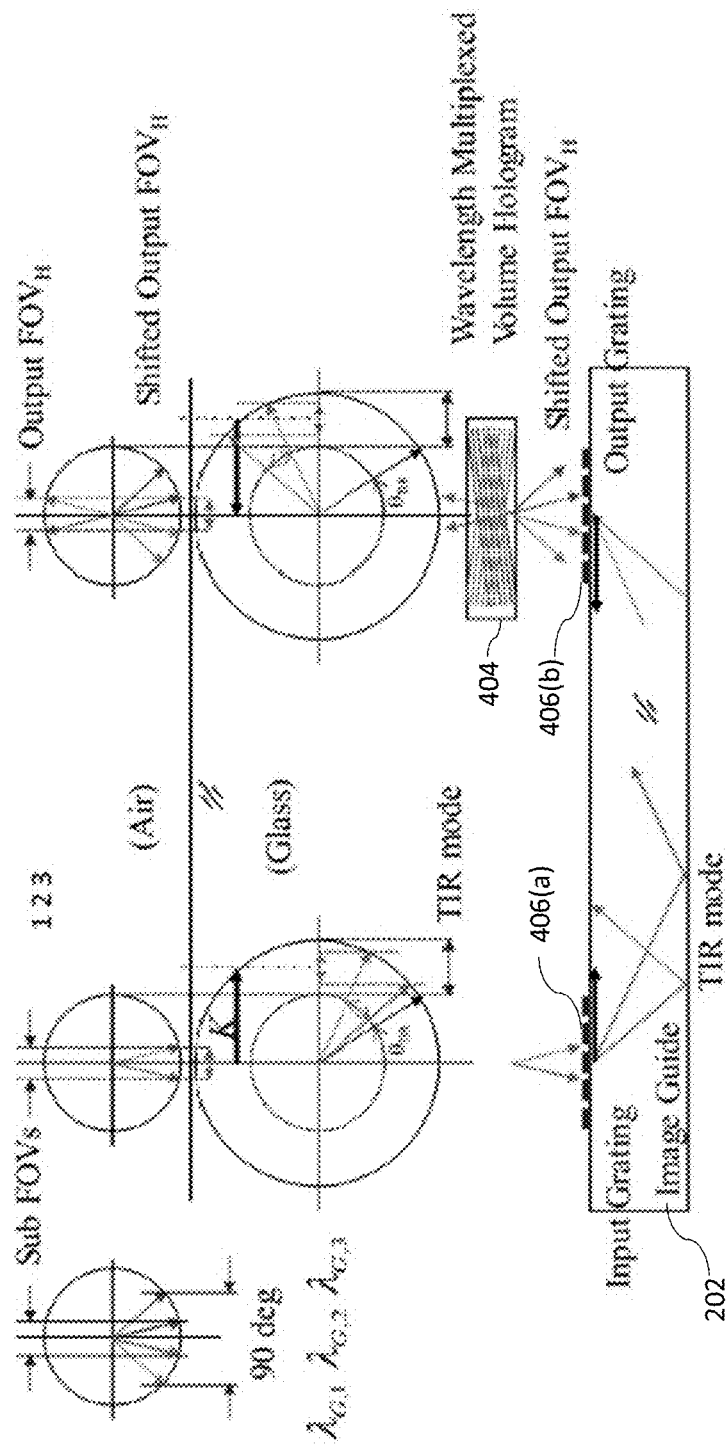
FIG. 5(b) illustrates Ewald sphere representation of FOV expansion, in accordance with an embodiment.

To overcome this material-imposed challenge, a time and wavelength multiplexed full color image transfer medium that effectively generates RGB, 90-degree FOV, and retinal resolution may be used as depicted in FIGS. 5(a)-5(b). The key component is a Volume Hologram (VH) 406 where reflection gratings are multiplexed.

Time and Wavelength Multiplexing

Figure 6A:
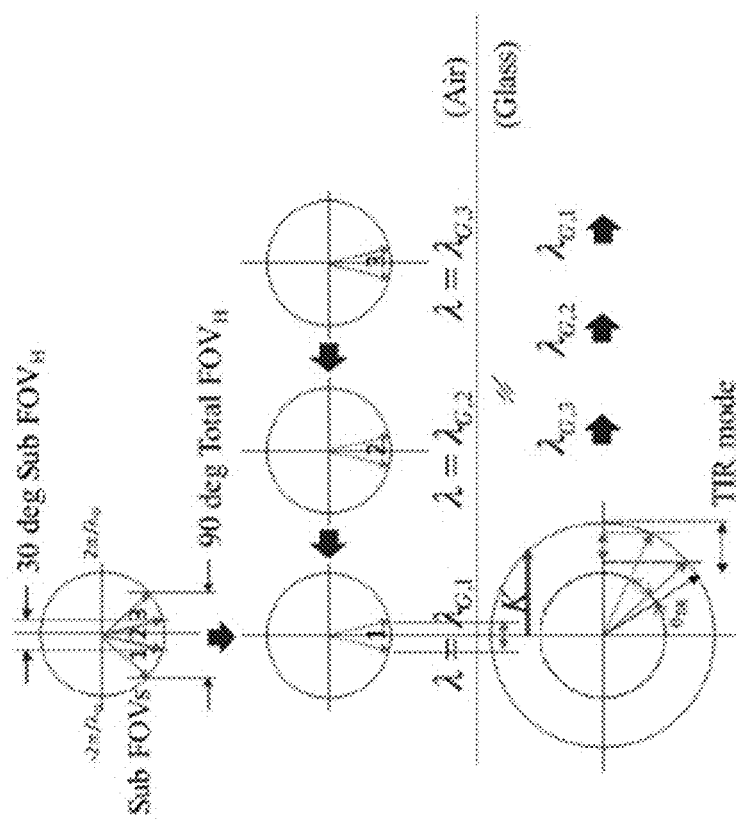
FIG. 6(a) is a detailed time sequence of encoding FOV by wavelength multiplexing, in accordance with an embodiment.
Figure 6B:
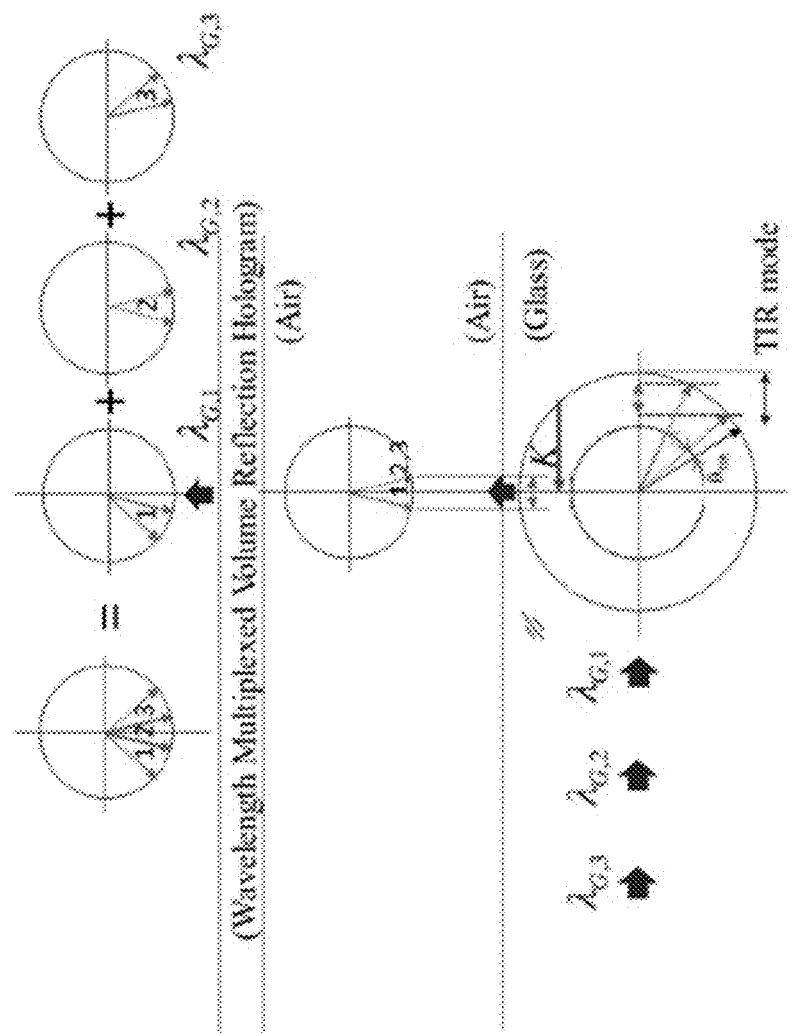
FIG. 6(b) is a detailed time sequence of decoding FOV by wavelength multiplexing, in accordance with an embodiment.

For the purpose of illustration of the principle, only green light sources $\lambda_{G1}$, $\lambda_{G2}$, and $\lambda_{G3}$ (and neighboring green wavelength sources) are considered. The key is to divide total FOV of 90 degrees into sub FOVs, $SubFOV_i$, and encode them in wavelength domain, and decode it by reflection volume hologram 406 (FIGS. 4(a) and 5(a)-5(b)) that is sensitive to wavelength, but not sensitive to angular variation. For example, we consider 3 sub FOVs (90/3=30 degrees) encoded by three green wavelengths, $\lambda_{G1}$, $\lambda_{G2}$, and $\lambda_{G3}$. Each of the sub FOVs are sequentially displayed while altering wavelength. In this configuration, an arrayed LD/LED is synchronized to the DMD so that the sub FOVs are sequentially displayed. Note that at the exit pupil of the projector, the FOV is still limited to 30 degrees which is within the angular bandwidth of the image guide 202. Thus, the entire sub FOV is transferred and out-coupled to air by the output grating 406(*b*). A volume hologram 404 is placed at the vicinity of the output grating 406(*b*). There, three Bragg reflectors are multiplexed. Each Bragg reflector is mutually slanted in 15 degrees. Angular and wavelength selectivity is tuned by index modulation and the thickness of the volume hologram 404 so that the Bragg reflector selectively redirect sub FOVs into +−30 degrees. Finally, the full deg FOV is retrieved in a time and wavelength multiplexed manner. The detail of time sequence of wavelength-based sub FOV encoding is depicted in FIGS. 6(*a*)-6(*b*).

The time/wavelength multiplexing is also employed to other wavelength $\lambda_{Ri}$, and $\lambda_{Bi}$. For example, sources ($\lambda_{R1}$, $\lambda_{G1i}$, $\lambda_{B1}$) generate an FOV-limited image $I_1$, sources ($\lambda_{R2}$, $\lambda_{G2i}$, $\lambda_{B2}$) generate an FOV-limited image $I_2$, and so on. As far as separation among the neighboring wavelength $\lambda_{RGBi+1}$–$\lambda_{RGBi}$ is not large, on a CIE-XYZ color map, color reproducibility is assured, and is subject to angular and wavelength selectivity. As a holographic material, RGB-sensitive materials such as Byfol® HL or other materials are commercially available and used in the feasibility study.

Wavelength multiplexing can be replaced with or complemented by other multiplexing techniques for encoding/decoding before/after the waveguide such as polarization multiplexing.

Time and Angular Multiplexing

Alternatively, a 2nd DMD 504 at the vicinity of the output coupler replaces the multiplexed volume hologram 404. The 1st generates a time and color multiplexed images with FOV smaller than that of full color FOV of the image guide 202. The image guide 202 transfers the FOV-limited images by TIR that is coupled to air by an output coupler. The 2nd DMD 504 is synchronized and actively redirects light over the total FOV. This approach eliminates the multi-wavelength sources and Bragg reflector. However, an additional optical system close to the eye is needed and designed to secure a see-through optical path.

Estimation of Power Consumption

According to a published document, "DLP Technology for Near Eye Display: Application Report" (http://www.ti.com/lit/an/dlpa051a/dlpa051a.pdf), page 11 states, "The DMD and controller combine to draw a typical power consumption of between 150 mW to 300 mW, depending on the array size and resolution." Also in "DLP2010 0.2 WVGA DMD" (http://www.ti.com/lit/ds/symlink/dlp2010.pdf), page 10 states a typical supply power dissipation of 90.8 mW. (DMD only). According to a source, without employing time multiplexing, DLP is competitive, in terms of system power consumption, with other display solutions of the same resolution. Some LCOS competitors may have a chipset power consumption that is slightly lower, but that gap is closed, or even flipped, when LED illumination power is taken into the equation thanks to the optical efficiency advantage of DLP technology.

In first order analysis, power consumption of the DLP device linearly scales with array size for a given mirror refresh rate because in DLP systems, most of the power is consumed in 1) storing address information on SRAM underneath the micro mirror array, and 2) applying voltage to initiate and terminate micro mirror motion. For other pixel-addressed micro display such as LCOS, a similar scaling of the power consumption with array size is expected.

Since the requirement of illumination power per pixel is a human factor, it is therefore reasonable to assume it is independent to the type of the micro display device. Under this assumption, based on the documented power consumption of DLP and statement, it is estimated a rough order of magnitude power consumption of 10M pixel equivalent ASLM as tabulated in Table 2, based on documented power consumption as tabulated in Table 1.

TABLE 1

Baseline power consumption data

|  | 1M pixel DMD | 1M pixel LCOS |
| --- | --- | --- |
| 1. Device [mW] | 90 | 50 |
| 2. Controller [mW] | 130 | 70 |
| 3. Illumination [mW] | 100 | 200 |
| Total [mW] | 320 | 320 |

TABLE 2

Estimated power consumption of 10M pixel device

|  | 10M pixel ASLM | 10M pixel LCOS |
| --- | --- | --- |
| 1. Device [mW] | 162 | 500 |
| 2. Controller [mW] | 234 | 700 |
| 3. Illumination [mW] | 600 | 2000 |
| Total [mW] | 996 | 3200 |

Effective "on" pixel count: 30% for both ASLM and LCOS. For ASLM: bit depth is halved for 80% of FOV (foveation)

Compared to a fictitious 10Mega pixel LCOS, ASLM consumes about ⅓ of 10Mega LCOS display. The most significant reduction in power occurs in illumination. LCOS device requires a flood illumination of the entire 10Mega pixel array, including off pixels where light is simply wasted. In contrast, ASLM with image steering is more efficient because only sub image areas containing on pixels, i.e., 30% of total of the full 10Mega pixels need to be illuminated. There are power consumption benefits in the device and controller too, since the area without information is simply skipped while ASLM scanning over the entire FOV.

A second significant reduction of power consumption in ASLM device and ASLM controller is by "Color foveation". In ASLM, the total FOV is divided into sub FOVs. Suppose eye/gaze tracking is available, color bit depth (refresh rate) of micro mirrors is "Foveated". For example, pixels around gaze direction, full color bit depth is displayed, while peripheral of the FOV, color bit depth is set to low (i.e., halved). For example, 20% of pixels are around gaze, 80% is in peripheral FOV, and bit depth is halved), the foveation of color reduces number of activating mirrors by 40% which directly reduces power consumption of DLP device and controller with the same rate. This advantage occurs because bit-depth of the DLP device is related to actuation speed of the DLP device, and actuation speed of the DLP device is related to driving power of the DLP device.

The preliminary analysis as tabulated in Table 2 indicates that ASLM is very competitive to alternatives in power consumption, thanks to the substantially smaller array area that increases efficiency in illumination as well as effective allocation of color bit depth over the FOV. Peripheral optics benefits in size reduction by the reduced array size. We incorporate the power consumption analysis and measurement as a part of research.

Framerate:

A similar discussion to power consumption holds for the frame rate. Refresh rate of DMD 200 is rated 23 kHz. ASLM requires all-off state, therefore frame rate is half of 23 kHz=11.5 kHz, compared to 60 Hz LCOS device, DLP has 200× higher frame rate. When 10 bit is allocated for color generation (factor of 0.1/3(RGB)), while taking into account the enhancement of frame rate by 1/{(effective on-area)×(Color Foveation)}=5.5, enhancement of frame rate is estimated as 11.5 kHz×(0.1/3)×5.5=2.1 kHz that allows 40 time multiplexing which in first order matched to the proposed number of time multiplexing.

To further evolve aspects of the invention, additional embodiments are considered below.

Figure 7:
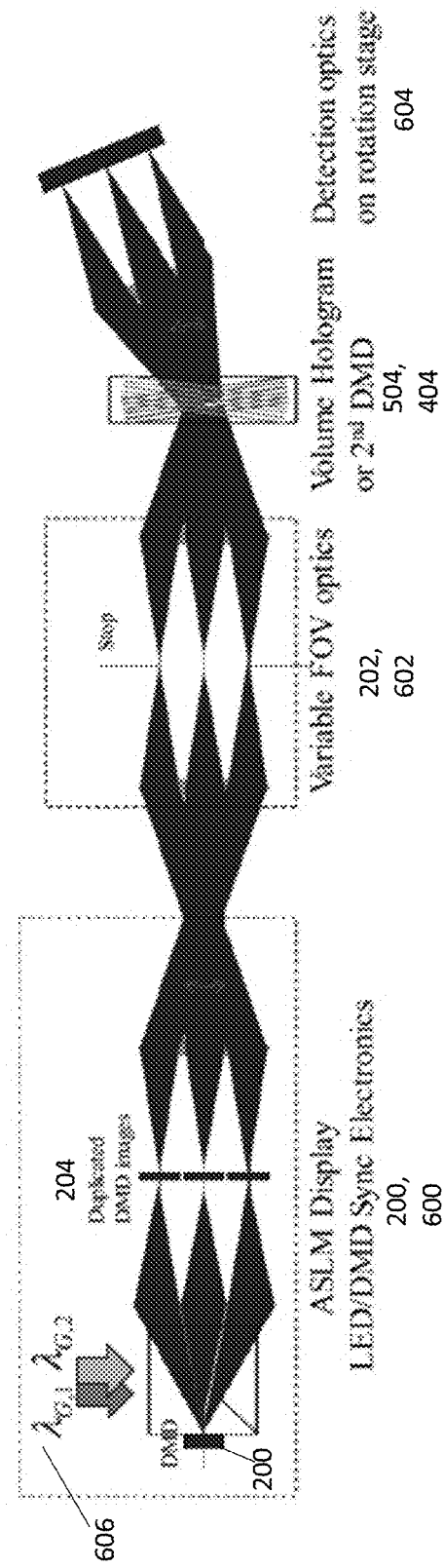
FIG. 7 is a schematic of experimental setup, in accordance with an embodiment.

It is a goal of an embodiment of the present invention to demonstrate feasibility of monochromatic, time, wavelength, and angular multiplexed 1-D image transfer by ASLM via a FOV limited free-space optics, by designing and developing test set up. In FIG. 7, schematics of the optical setup is depicted. The image of the ASLM display 600 is relayed to volume hologram 404 via variable FOV optics 602 which simulate image guide optics. An extended FOV is captured by detection optics 604 mounted on a rotation stage. Also, in lieu of the volume hologram 404, angular de-multiplexing by a 2nd DMD 504 is tested. The DMD(s) 200, 504 and light sources 606 are synchronized by LED/DMD sync electronics in micro-controller.

The system design should have bandwidth allocation with an established mathematical model of optical architecture. The ASLM display design can be implemented with a 1-D array optics and various types of illumination sources. The system design also includes an in-house holographic recording setup to record volume hologram with 2 multiplexed Bragg reflector. The system design includes a DMD, optics, and light source assembled to demonstrate an ASLM single layer image transfer concept. FOV(H) extends beyond FOV (H) of the image guide by the volume hologram and 2nd DMD.

Figure 8A:
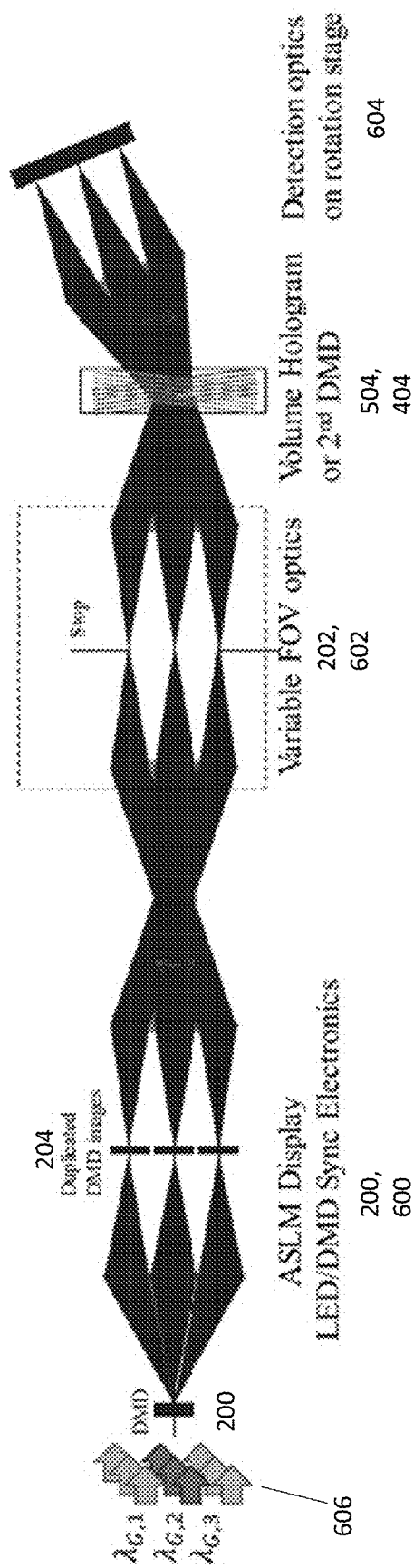
FIG. 8(a) is a schematic of 2D-ASLM experiment setup, in accordance with an embodiment.
Figure 8B:
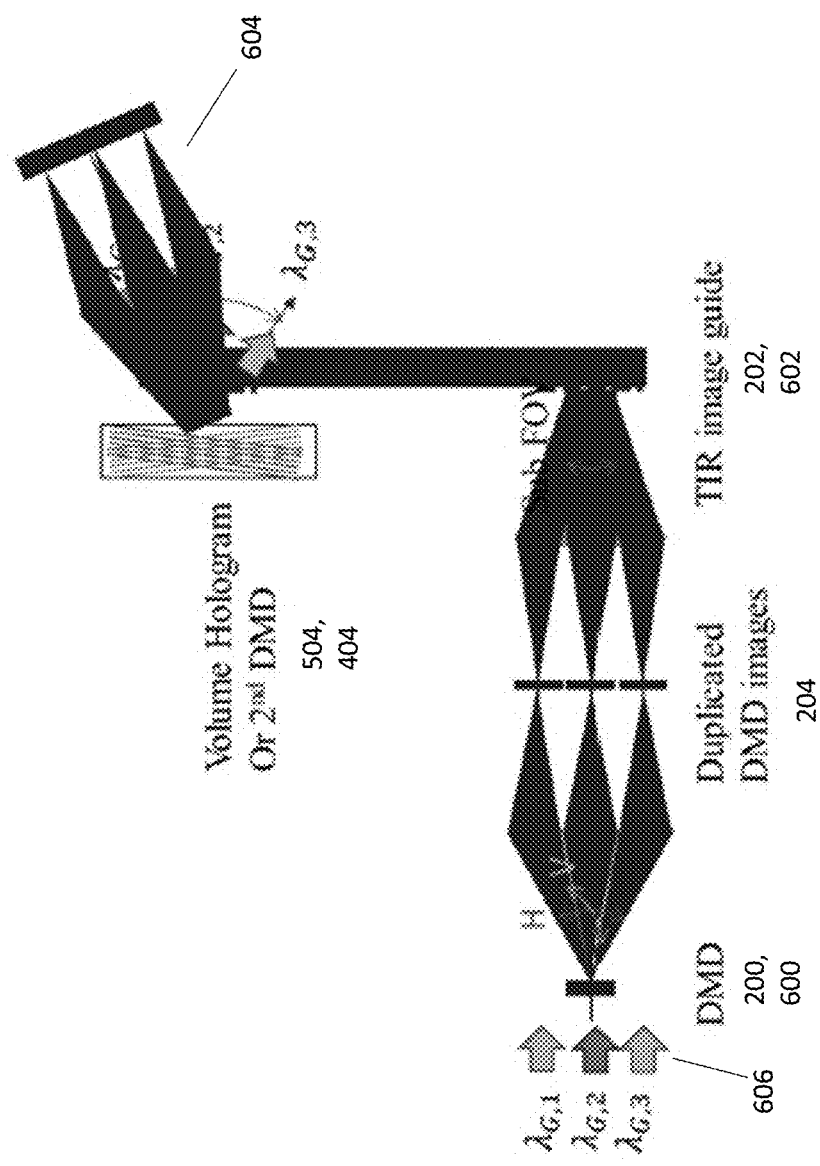
FIG. 8(b) is a schematic of 1D-ASLM with Image guide experiment setup, in accordance with an embodiment.

It is a goal of an embodiment of the present invention to demonstrate feasibility of monochromatic time, illumination, wavelength, and angular 2-D multiplexed image transfer by ASLM 600 via an FOV-limited image guide 602 by improving the test set up as depicted in FIGS. 8(a) and 8(b). ASLM 600 is expanded into 2D by incorporating 2D light source array 606 (FIG. 8(a)). Separately, image transfer is tested via image guide 202 (FIG. 8(b)). 2-D array optics and 2D illumination sources are implemented. Monochromatic holograms are recorded either in-house holographic recording setup with 3 multiplexed Bragg reflectors. The DMD, optics, and light source demonstrate an ASLM single layer image transfer concept. 90 deg FOV(H) beyond FOV(H) of the image guide is demonstrated by the volume hologram and/or the 2nd DMD.

Figure 9:
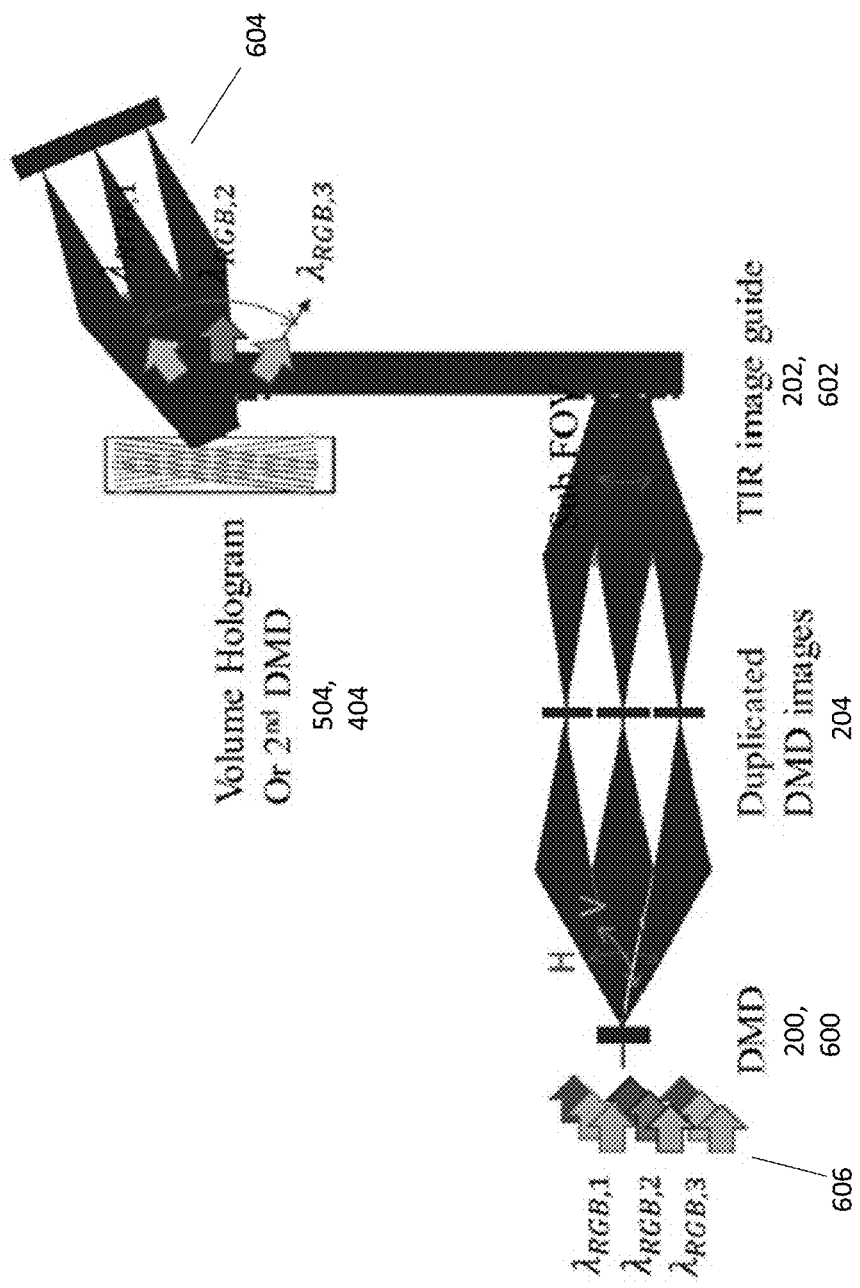
FIG. 9 is a schematic of experimental setup, in accordance with an embodiment.

It is a goal of an embodiment of the present invention to demonstrate the feasibility of RGB time, illumination, wavelength and angular 2-D multiplexed image transfer by ASLM 600 via an FOV limited image guide 202, by improving test set up as depicted in FIG. 9. A 2D ASLM display is implemented into the test bed, along with the volume hologram and the SRG image guide.

Figure 10:
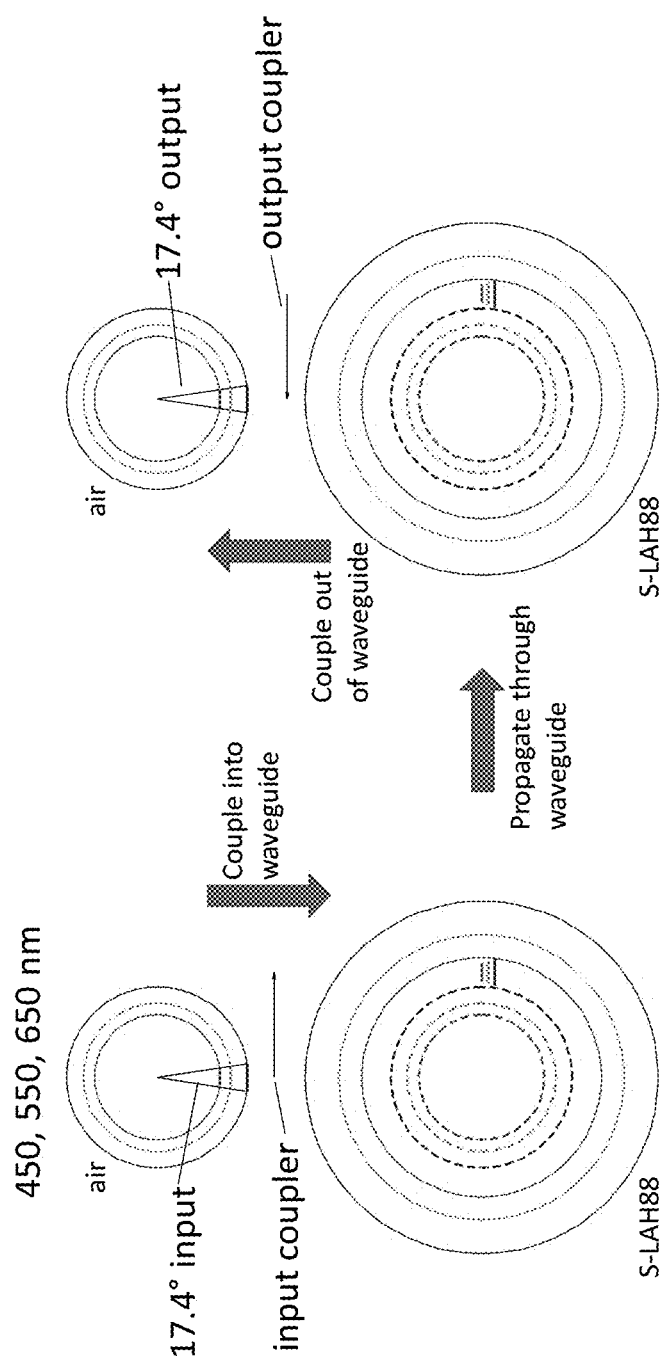
FIG. 10 illustrates Ewald sphere prior art representation of bandwidth limitation in a waveguide.

To demonstrate earlier state of the art, the red, green, blue (RGB) bandwidth limitation of waveguides is depicted in FIG. 10. The input is shown in the top left Ewald spheres (shown as circles) as a 17.4 degree wedge in three red, green, blue (450 nm, 550 nm, 650 nm) concentric circles with radii corresponding the respective wavelength's k-vector calculated by $k=2\pi n/\lambda$, where n is the refractive index (for air n=1) and $\lambda$ is the wavelength. A horizontal line between the wedge at a wavelength's radii represents the angular bandwidth for that wavelength. The bottom left concentric rings show Ewald spheres for S-LAH88 at the corresponding wavelengths as well as the original air circles (shown dotted). An input coupler shown as a horizontal black arrow between the top-left and bottom-left circles shifts the input bandwidths where the length of the arrow is the k-vector of the coupler, for instance a grating or hologram of k-vector $2\pi/\Lambda$ where $\Lambda$ is the period of the grating. Once shifted, the input bandwidth must fit within the space between the largest air Ewald sphere (dotted line) and the smallest glass Ewald sphere (solid line), or else part of the bandwidth will not propagate through the TIR bandwidth of the waveguide. After propagation through the waveguide, an output coupler grating or hologram of the same k-vector magnitude as the input shifts the bandwidth outside the TIR bandwidth range, shown in the top and bottom Ewald spheres (shown as circles) on the right.

Figure 11A:
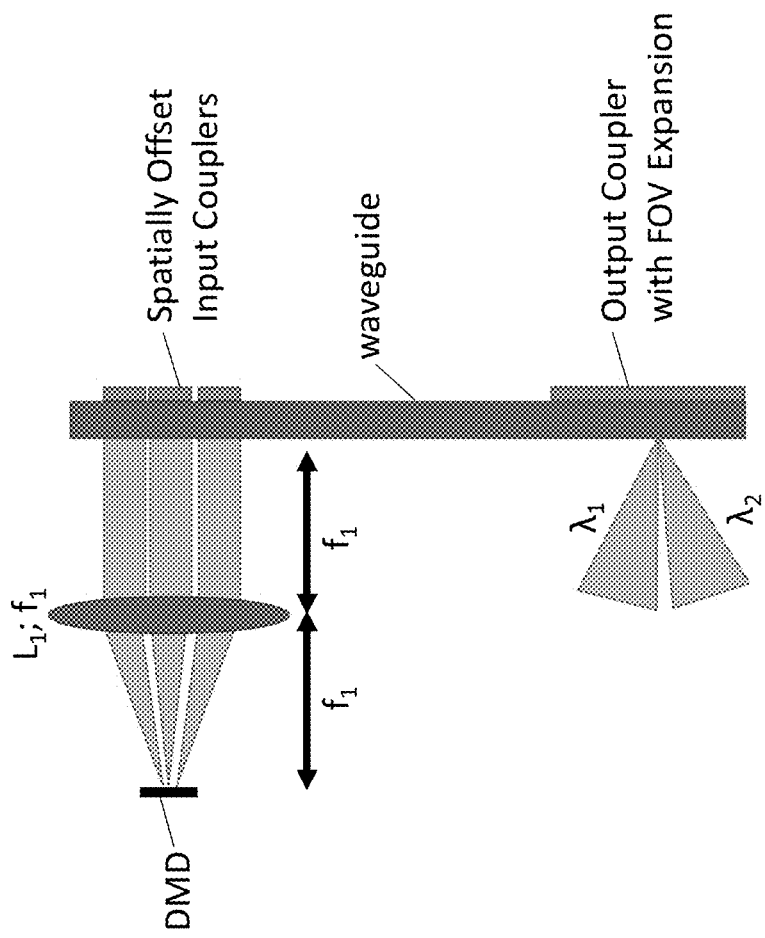
FIG. 11(a) is a schematic of single layer and multiplexed full color wide FOV image transfer, in accordance with an embodiment.

In an embodiment shown in FIG. 11(a), light is output by a DMD into multiple diffraction orders and is collimated by a lens in an f-f configuration. The collimated light is then incident upon a waveguide and multiple input couplers such that light from different diffraction orders are spatially offset. Light from each diffraction order is coupled by a corresponding and separate input coupler to direct the angular bandwidth from the DMD into different partitions of the waveguide's TIR bandwidth. An output coupler outputs the light from the waveguide.

In an embodiment shown in FIG. 11(a), multiple sources of different wavelengths corresponding to the same color (e.g., 550 nm and 560 nm both being red) are used so that the output coupler directs different wavelengths into different directions by wavelength dependence of the coupler (i.e., wavelength multiplexing) to extend the FOV. In an embodiment, polarization multiplexing is used instead of wavelength multiplexing. In an embodiment, polarization multiplexing is used in conjunction with wavelength multiplexing.

Figure 11B:
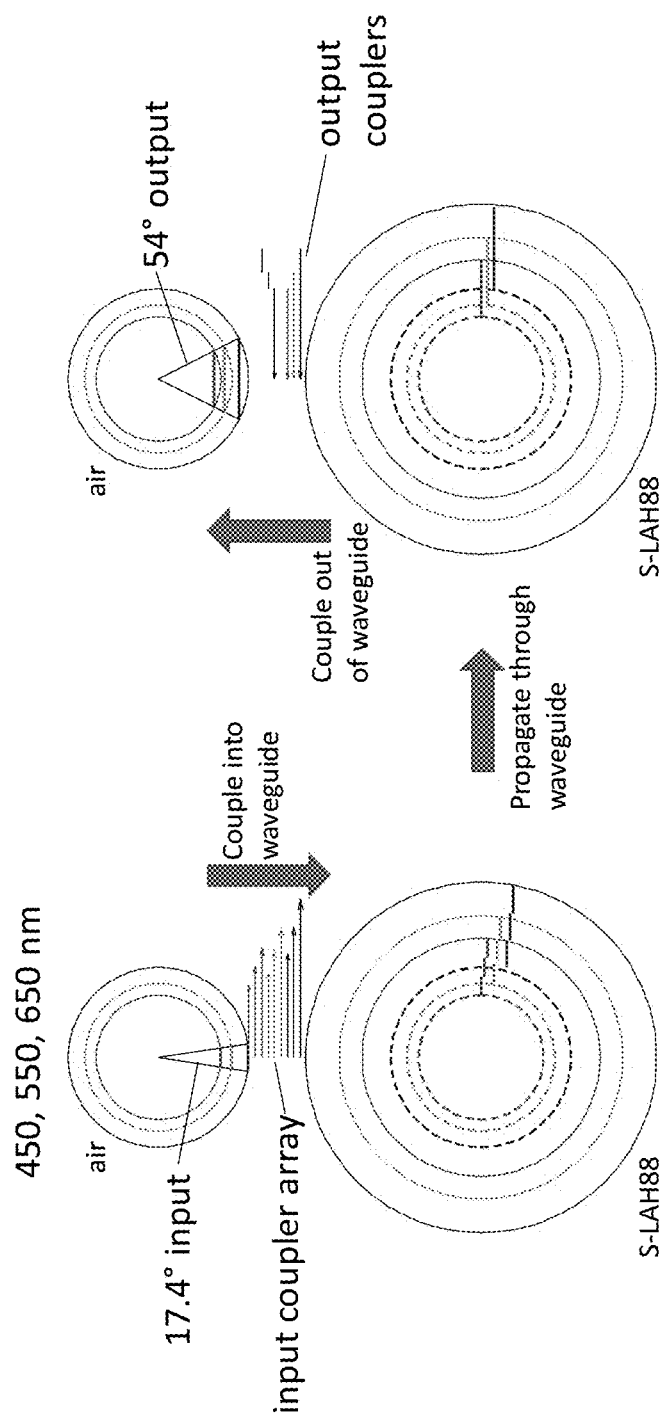
FIG. 11(b) illustrates how multiple spatially offset couplers can more increase the usable range of a TIR bandwidth of a waveguide, in accordance with an embodiment.

In an embodiment, FIG. 11(b) shows how multiple spatially offset couplers can more increase the usable range of a TIR bandwidth of a waveguide. Three sources (e.g., 450 nm, 550 nm, 650 nm) illuminate a DMD with light, and a lens collimates the light from three diffraction orders from the DMD into the waveguide using diffraction-order-dependent and spatially-offset input couplers shown in FIG. 11(a). The nine horizontal arrows on the left correspond to k-vectors of a corresponding input coupler array where each input coupler (e.g., grating or hologram) shifts the same original bandwidth by different amounts in angular space, allowing different red, green, and blue sub-FOVs to be partitioned to the wavelength-dependent TIR bandwidth ranges of the waveguide. In an embodiment, each wavelength bandwidth may require a different amplitude k-vector output coupler (as shown by the k-vectors on the right) to output all bands without wavelength-dependent angular offset.

Figures 11C, 11D:
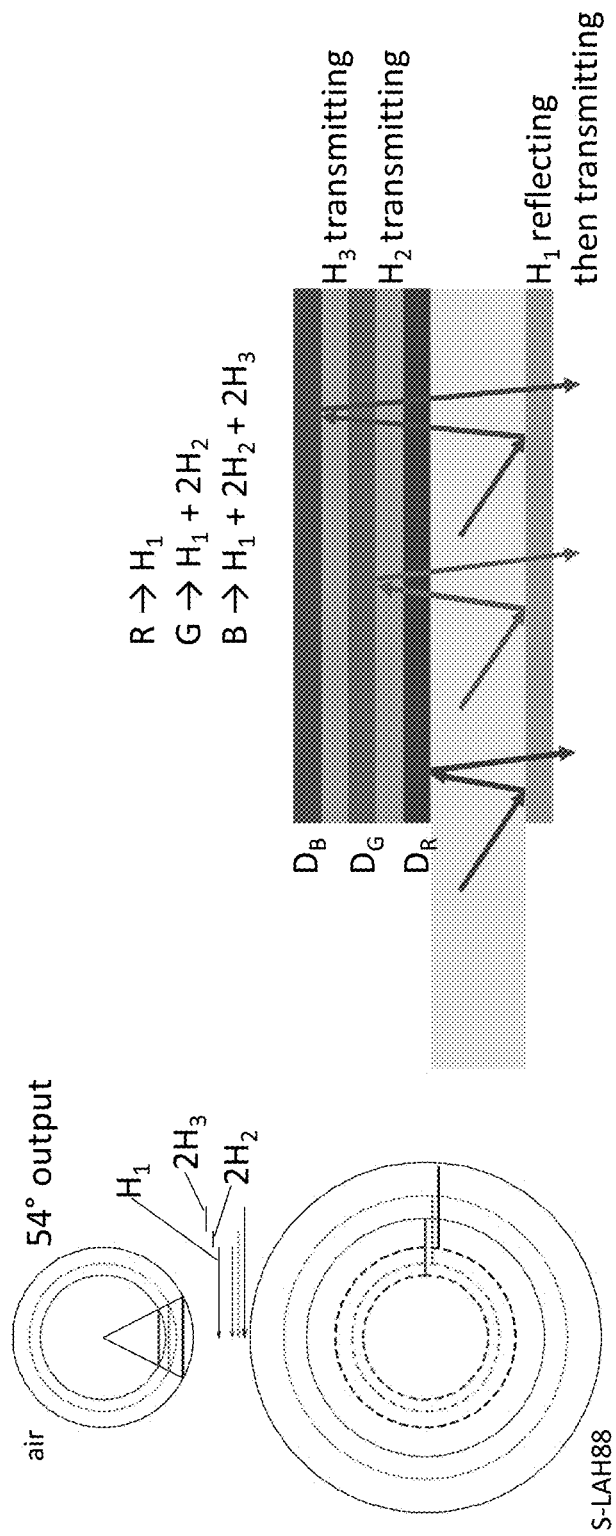
FIG. 11(c) illustrates different wavelengths output by different combinations of output coupling gratings, in accordance with an embodiment.
FIG. 11(d) illustrates a configuration of reflective wavelength-dependent dichroic coatings and holograms (or gratings) to achieve the correct angular bandwidth shift required for each wavelength to output couple the full TIR bandwidth of each wavelength, in accordance with an embodiment.

In an embodiment, FIG. 11(c) shows different wavelengths can be output by different combinations of output coupling gratings. As shown, the length of the required red output coupler vector is equivalent to the length of the $H_1$ output coupler vector. Similarly, the length of the required green output coupler vector is equivalent to the sum of vectors $H_1$ and $2H_2$. Similarly, the length of the required blue output coupler vector is equivalent to the sum of vectors $H_1$ and $2H_2$ and $2H_3$.

In an embodiment, FIG. 11(d) shows a configuration of reflective wavelength-dependent dichroic coatings and holograms (or gratings) to achieve the correct angular bandwidth shift required for each wavelength to output couple the full TIR bandwidth of each wavelength. The $H_1$ vector is imparted upon reflection through the $H_1$ coupler, and the $H_2$ and $H_3$ vectors are imparted upon transmission through the $H_2$ and $H_3$ couplers, respectively. The path of red wavelength light (shown as a red line) reflects from $H_1$, reflects from dichroic coating $D_R$, and transmits through the waveguide and $H_1$ to output at the correct output angle. The path of green wavelength light (shown as a green line) reflects from $H_1$, transmits through dichroic coating $D_R$ and coupler $H_2$, reflects from dichroic coating $D_G$, transmits through $H_2$ and dichroic coating $D_R$, and transmits through the waveguide and $H_1$ to output at the correct output angle. The path of blue wavelength light (shown as a blue line) reflects from $H_1$, transmits through dichroic coating $D_R$, coupler $H_2$, dichroic coating $D_G$, and coupler $H_3$, reflects from dichroic coating $D_B$, transmits through couple $H_3$, dichroic coating $D_G$, coupler $H_2$, and dichroic coating $D_R$, and transmits through the waveguide and $H_1$ to output at the correct output angle.

Figure 12A:
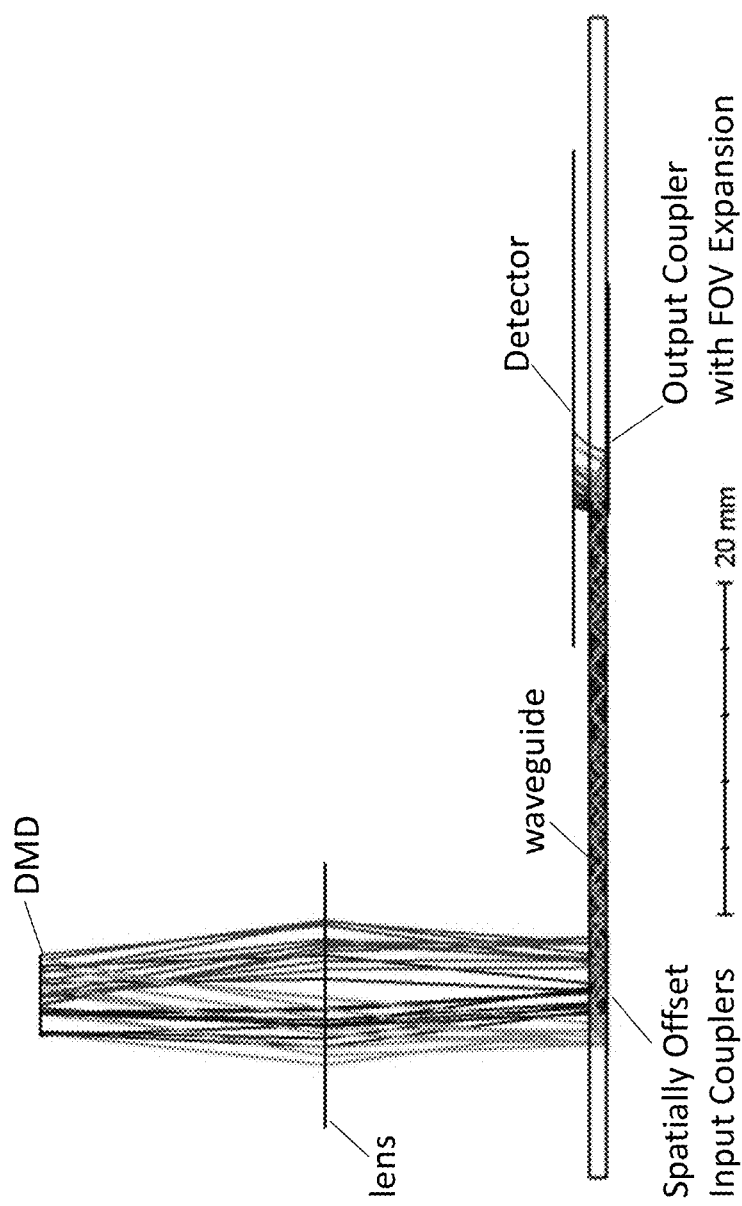
FIG. 12(a) illustrates a ray trace model of a DMD outputting light of two wavelengths into three diffraction orders, in accordance with an embodiment.

In an embodiment, FIG. 12(a) shows a ray trace model of a 5 mm square (per side) DMD outputting light of two wavelengths into three diffraction orders (both wavelengths per diffraction order) to be collimated by a lens of 17 mm focal length (the DMD area therefore has a horizontal FOV of 16.7 degrees) in an f-f configuration shown in FIG. 11(a) so that light from each diffraction order is spatially offset for input coupling into a waveguide by spatially offset input couplers of different k-vectors to fill the waveguide bandwidth. The rays in FIG. 12(a) are colored by diffraction order. After propagating through the waveguide, a wavelength-dependent output coupler (i.e., the k-vector of the output coupler is different for each wavelength) outputs the light from the waveguide.

Figure 12B:
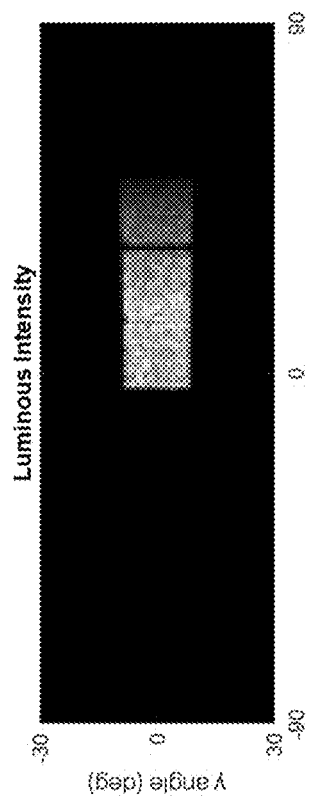
FIGS. 12(b) and 12(c) illustrate simulated results of the ray trace model shown in FIG. 12(a).
Figure 12C:
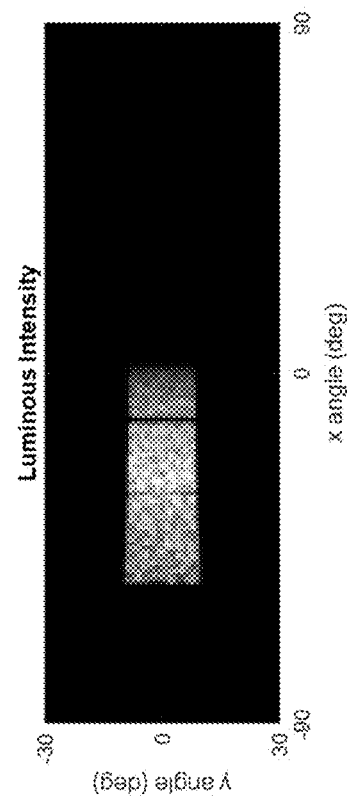

FIG. 12(b) and FIG. 12(c) show simulated results of the ray trace model shown in FIG. 12(a). FIG. 12(b) shows the luminous intensity distribution in angular space of the light output from the waveguide for a first wavelength (the three diffraction orders are visibly separate for demonstrative purposes, though a continuous display area is likely preferred) covering −4.4 degrees to 51.1 degrees (a total of 55.5 degrees) horizontally. FIG. 12(c) shows the luminous intensity distribution in angular space of the light output from the waveguide for a second wavelength (the three diffraction orders are visibly separate for demonstrative purposes, though a continuous display area is likely preferred) covering −54.3 degrees to 1.5 degrees (a total of 55.8 degrees) horizontally. The combination of the two wavelengths span a horizontal output of 105.4 degrees.

Figure 13:
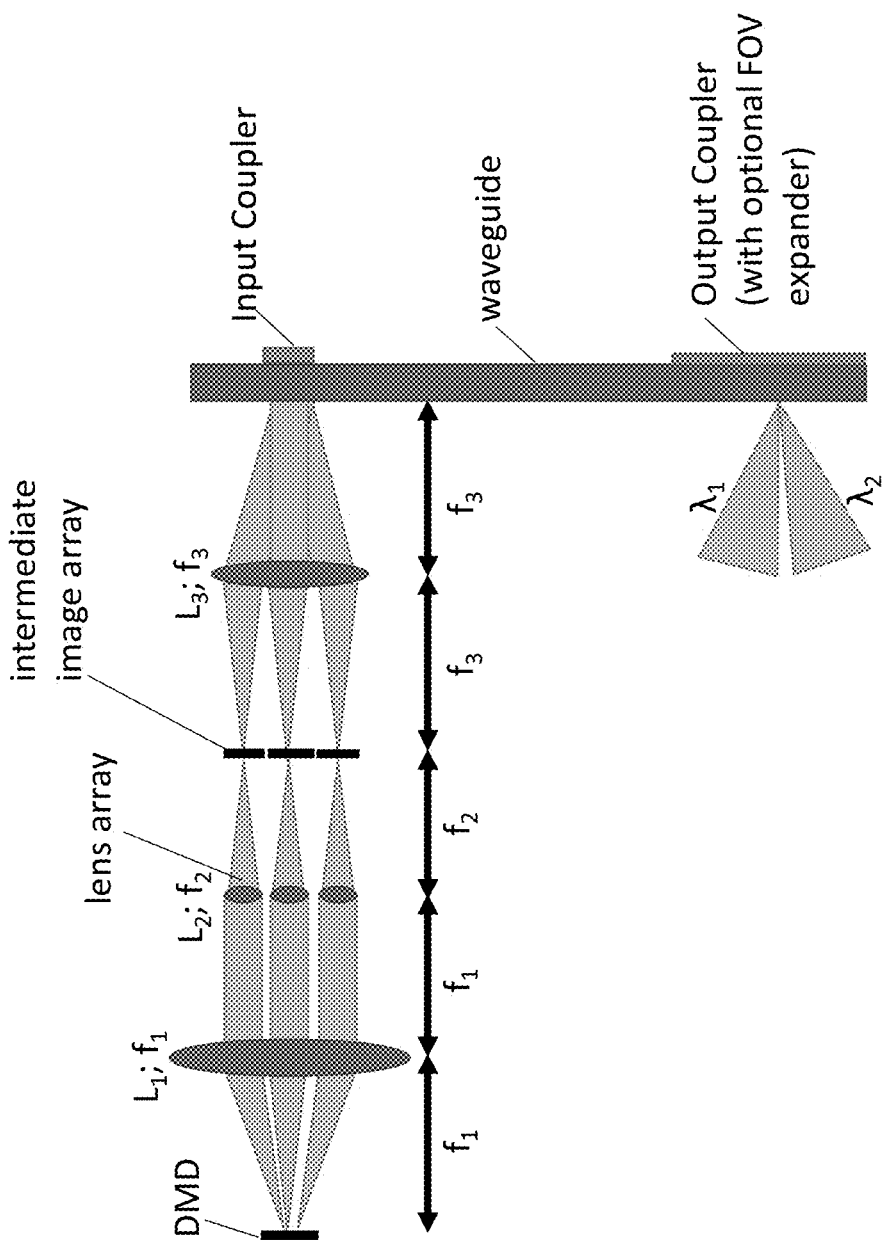
FIG. 13 illustrates a configuration to increase pixel density and/or pixel count projected by a DMD through a waveguide, in accordance with an embodiment.

In an embodiment, FIG. 13 is a configuration to increase pixel density and/or pixel count projected by a DMD through a waveguide. A DMD is illuminated by a light source (not shown) to project patterns into multiple diffraction orders (i.e., multiple discrete directions, each pattern (i.e., image) going into a selectable direction) using a short-pulse illumination pattern steering technique (see B. Hellman and Y. Takashima, "Angular and spatial light modulation by single digital micromirror device for multi-image output and nearly-doubled étendue," Optics Express 27, 21477-21496 (2019)) to form an intermediate image array through a lens array. The intermediate image array (shown as real images but can be virtual images) can act as a singular object plane for projection into a waveguide through an input coupler. The number of display pixels coupled into the waveguide is the number of micromirror pixels on the DMD times the number of diffraction orders (i.e., directions, including directions selected by multiple illumination sources used in different ASLM architectures) being used to form the intermediate image array. An output coupler outputs the projection from the waveguide for observation by a viewer (not shown).

In an embodiment, source multiplexing (wavelength, polarization, etc) can be used to increase the output FOV using an output coupler with equivalent multiplexing (e.g., wavelength or polarization multiplexing output coupler, (e.g., volume hologram that is wavelength or polarization dependent)), shown on the bottom of FIG. 13. In some embodiments, the output coupler may be a combination of components (e.g., a surface-relief grating optically coupled to a volume hologram, or a combination of dichroic coatings and gratings), and the multiple components may be on the same side of the waveguide or opposite sides of the waveguide due to diffraction efficiency considerations.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

Each of the Following References are Incorporated Herein by Reference:

[1] B. Hellman and Y. Takashima, "Angular and spatial light modulation by single digital micromirror device for multi-image output and nearly-doubled étendue," Optics Express 27, 21477-21496 (2019)

[2] Private preview of 1G-pix display at Industrial Affiliates Workshop meeting at the University of Arizona, 1630 E University Blvd, Tucson, AZ, USA, on Oct. 23, 2019.

[3] B. Smith, B. Hellman, A. Gin, A. Espinoza, and Y. Takashima, "Single chip lidar with discrete beam steering by digital micromirror device," Optics Express 25(13), 14732-14745 (2017). https://www.osapublishing.org/oe/abstract.cfm?&uri=oe-25-13-14732

[4] S. S. Orlov, W. Phillips, E. Bjornson, Y. Takashima, P. Sundaram, L. Hesselink, R. Okas, D. Kwan, R. Snyder. "High-transfer-rate high-capacity holographic disk data-storage system," Applied Optics, 43:4902, (2004).

[5] T. Nakamura, Y. Takashima, "Design of discretely depth-varying holographic grating for image guide based see-through and near-to-eye displays," Optics Express 26, 26520-26533 (2018); https://www.osapublishing.org/oe/abstract.cfm?uri=oe-26-20-26520

[6] B. Hellman, T. Lee, J.-H. Park, Y. Takashima, "Gigapixel and 1440-perspective extended-angle display by megapixel MEMS-SLM," Optics Letters 45(18), 5016-5019 (2020).

What is claimed is:

1. An image guide device, comprising:
   a digital micromirror device (DMD) with an illumination source optically couple thereto;
   wherein a plurality of wavelengths from the illumination source each have a total field of view (FOV) and the DMD divides the total FOV into sub-FOVs;
   an image guide having an input grating and output grating, the input grating optically coupled to the DMD such that the image guide receives the plurality of wavelengths with sub-FOVs from the DMD at the input grating;
   a holographic waveguide optically coupled to the output grating of the image guide such that the holographic waveguide receives the plurality of wavelengths with sub-FOVs and multiplexes the plurality of wavelengths to the total FOV.

2. The device of claim 1, wherein the holographic waveguide comprises one or more Bragg reflectors.

3. The device of claim 2, wherein the Bragg reflectors are positioned at a 15-degree angle.

4. The device of claim 1, wherein the illumination source is an LD or LED array.

5. The device of claim 1, wherein the illumination source is a 2D light source array.

6. The device of claim 1, further comprising detection optics optically coupled to the holographic waveguide, wherein the detection optics capture the total FOV from the holographic waveguide.

7. An image guide device, comprising:
   a primary digital micromirror device (DMD) with an illumination source optically couple thereto;
   wherein a plurality of images from the illumination source each have a total field of view (FOV) and the primary DMD divides the total FOV into sub-FOVs;
   an image guide having an input grating and output grating, the input grating optically coupled to the primary DMD such that the image guide receives the plurality of images with sub-FOVs from the primary DMD at the input grating;
   a secondary DMD optically coupled to the output grating of the image guide such that the secondary DMD receives the plurality of images with sub-FOVs and redirects the plurality of images with sub-FOVs over the total FOV.

8. The device of claim 7, wherein the illumination source is an LD or LED array.

9. The device of claim 7, wherein the illumination source is a 2D light source array.

10. The device of claim 7, further comprising detection optics optically coupled to the secondary DMD, wherein the detection optics capture the total FOV from the secondary DMD.

11. An augmented reality near to eye display system, comprising:
    an Angular Spatial Light Modulator (ASLM) emitting pulses of light, each pulse of light being
      spatially modulated with an image, and
      angularly modulated with a direction;
    a waveguide with an input coupler and an output coupler,
    wherein the input coupler is configured to couple the doubly modulated pulses of light from the ASLM into the waveguide, and the output coupler is configured to couple the pulses of light out of the waveguide.

12. The system of claim 11, wherein the ASLM comprises an illumination source array and a Spatial Light Modulator (SLM), and the pulse of light being angularly modulated is due to changing illumination sources.

13. The system of claim 11, wherein the ASLM comprises an illumination source and a Digital Micromirror Device (DMD), and the pulse of light being angularly modulated is due to diffraction-based beam steering, and each direction is a diffraction order.

14. The system of claim 11, wherein the ASLM comprises an illumination source array and a Digital Micromirror Device (DMD), and the pulse of light being angularly modulated is due to diffraction-based beam steering and changing illumination sources.

15. The system of claim 11, wherein the input coupler is an array of input couplers, and each input coupler is further configured to receive doubly modulated pulses of light of a unique direction.

16. The system of claim 11, further comprising a lens array configured to form the doubly modulated pulses of light into an intermediate image array before the waveguide.

17. The system of claim 11, wherein the ASLM further modulates the pulses of light by wavelength, and the output coupler is wavelength multiplexed.

18. The system of claim 11, wherein the ASLM further modulates the pulses of light by polarization, and the output coupler is polarization multiplexed.

19. The system of claim 11, wherein the output coupler comprises a volume hologram.

20. The system of claim 11, wherein the output coupler comprises a dichroic coating.

* * * * *